No. 818,810. PATENTED APR. 24, 1906.
C. BARGAMIN.
TEMPERATURE REGULATOR.
APPLICATION FILED APR. 6, 1905.
2 SHEETS—SHEET 1.
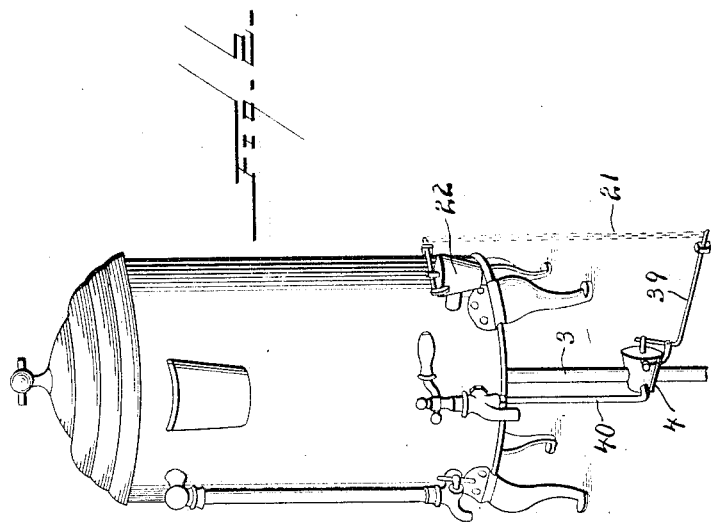
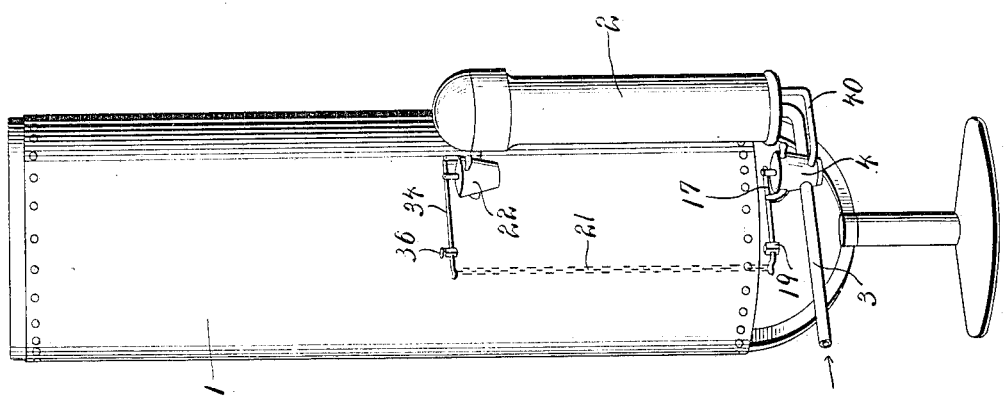
WITNESSES:
INVENTOR
Clifford Bargamin
BY
Rexford M. Smith, Attorney.

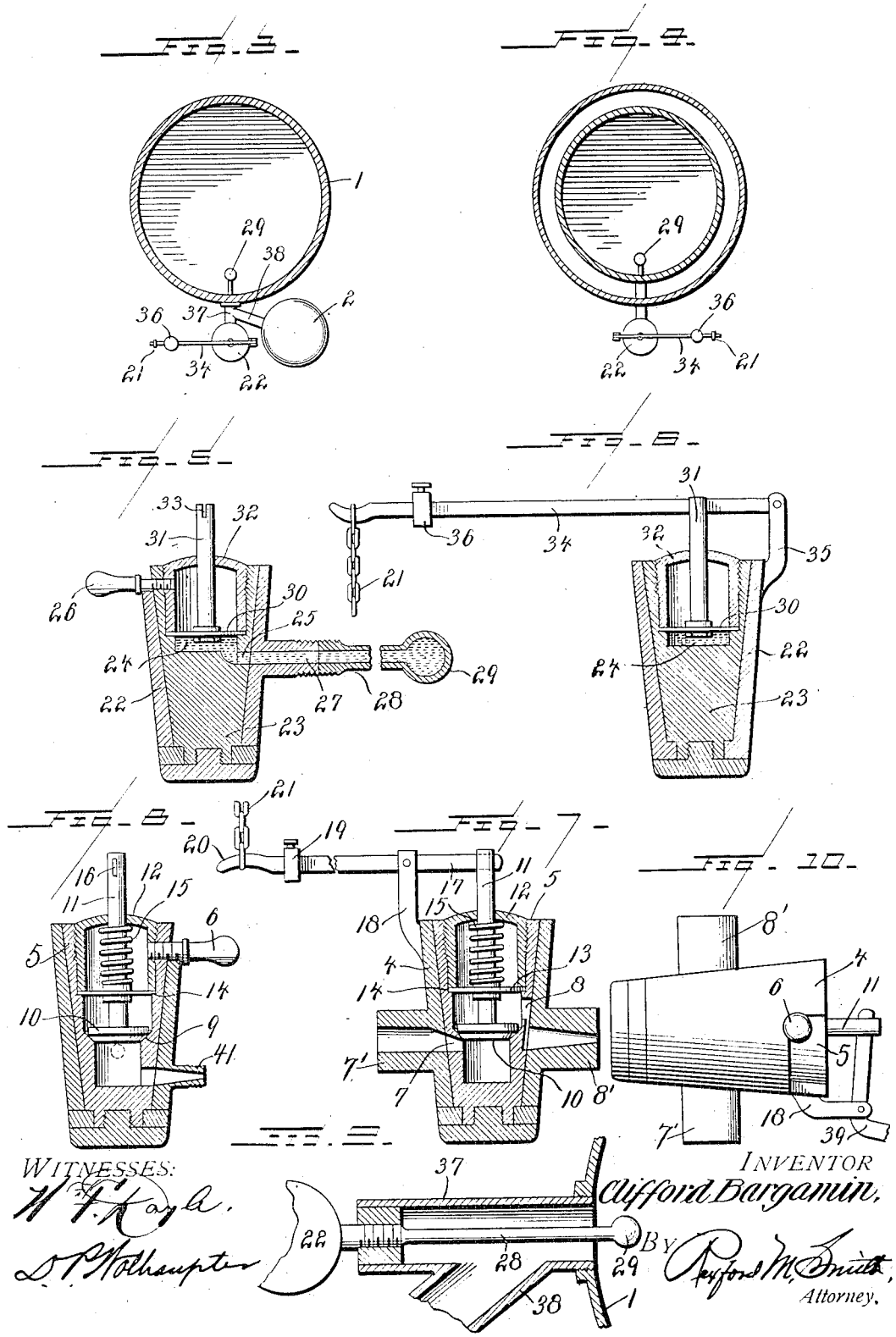

UNITED STATES PATENT OFFICE.

CLIFFORD BARGAMIN, OF NEWPORT NEWS, VIRGINIA.

TEMPERATURE-REGULATOR.

No. 818,810.   Specification of Letters Patent.   Patented April 24, 1906.

Application filed April 6, 1905. Serial No. 254,181.

*To all whom it may concern:*

Be it known that I, CLIFFORD BARGAMIN, a citizen of the United States, residing at Newport News, in the county of Warwick and State of Virginia, have invented a certain new and useful Temperature-Regulator, of which the following is a specification, reference being had therein to the accompanying drawings.

This invention relates to temperature-regulators, the object of the invention being to provide means adapted to be associated with a boiler, hot-water heater, or urn for containing coffee and the like for maintaining the contents of the vessel or receptacle at a certain or predetermined temperature by controlling the supply of fuel to the burner placed under or adjacent to the vessel containing the liquid.

The invention is especially designed with reference to gas-burners, the invention consisting in the particular means whereby the flow of gas to the burner is regulated or controlled and in some cases entirely cut off by means of a device associated with the vessel containing the liquid being heated, said device serving to actuate suitable connections leading to the supply-pipe which communicates with the gas-burner.

A further object of the invention is to provide means whereby the gas-controlling valve may be set so that it will be caused to open or close partially or wholly at any desired temperature of the liquid in the vessel or receptacle.

A further object of the invention is to provide means for regulating the flow of gas to the burner in accordance with the local gas-pressure.

The invention is also adapted for use in connection with hot-water heaters for house-heating purposes, such as bath-heaters.

With the above and other objects in view the invention consists in the novel construction, combination, and arrangement of parts, as hereinafter fully described, illustrated, and claimed.

In the accompanying drawings, Figure 1 is a perspective view of a bath-boiler, showing a heater associated therewith and also illustrating the adaptation of the present invention thereto. Fig. 2 is a similar view of a coffee-urn, showing the invention applied thereto. Fig. 3 is a horizontal section through Fig. 1. Fig. 4 is a horizontal section through Fig. 2. Fig. 5 is an enlarged longitudinal section through the thermostat. Fig. 6 is a similar section through the thermostat, taken at right angles to Fig. 5. Fig. 7 is a vertical longitudinal section through the gas-valve. Fig. 8 is a similar section through the gas-valve, taken at right angles to Fig. 7. Fig. 9 is a sectional view of the special fitting or branched coupling used in connection with the heater shown in Fig. 1. Fig. 10 is a view in elevation of the special form of gas-valve shown in use in Fig. 2.

Like reference-numerals designate corresponding parts in all the figures.

Referring to the drawings, I have shown in Fig. 1 an ordinary bath-boiler 1, in connection with which the usual heater 2 is employed, the same being provided with a burner (not shown) fed by a suitable gas-supply pipe 3. At a suitable point in the pipe 3 is located a gas-valve embodying a casing 4, having a tapering bore, in which is fitted a plug-valve 5, ground to a taper joint and adapted to be turned by a handle 6, so as to throw the inlet and outlet ports 7 and 8 thereof into and out of register with the passage of the supply-pipe 3, thus enabling the gas-supply to be manually turned on and cut off at will. The casing is provided with nipples 7' and 8' to connect, respectively, with the supply-pipe 3 and the pipe which leads to the main burner. The valve 5 is hollowed out, and a valve-seat 9 is formed between the inlet and outlet ports, as shown in Fig. 7. Coöperating with said valve-seat is an automatic cut-off valve 10, provided with a stem 11, which leads outward through a cap or plug 12, screwed into the upper end of the valve 5, the inner end of said cap or plug serving to clamp a gas-tight diaprahgm 13 against an annular ledge or shoulder 14. The valve-seating spring 15 serves to hold the valve normally seated. The outer end of the stem 11 is provided with a slot 16 to receive one arm of the lever 17, which is fulcrumed on a bracket 18 on the valve-casing 4. The other arm of said lever is provided with an adjustable weight 19, which may be shifted lengthwise of said lever for increasing or decreasing the resistance to the unseating of the automatic cut-off valve, and thereby regulate the flow of gas in accordance with the local gas-pressure. The extremity of the lever is curved or hooked, as shown in 20, for the attachment of one end of a flexible connection 21, which leads to the temperature-valve lever, to be described.

The thermostat (shown best in Figs. 5 and 6) comprises a casing 22, in which is a movable member consisting, preferably, of a ground taper-plug valve 23, which is hollowed out to form an expansion-chamber 24 and provided with a passage or port 25, which may be thrown by handle 26 into or out of line with the passage 27 of a hollow stem 28, which passes through the side wall of the boiler or urn or other liquid-receptacle and is provided with a hollow enlargement or bulb 29, adapted to contain mercury or other liquid which will expand as the liquid in the boiler or urn becomes heated. The expansion-chamber 24 is covered and inclosed by a flexible diaphragm 30, from which a post 31 extends outward through a cap or plug 32, screwed into the valve 23 and serving to clamp the diaphragm 30 in place. The post 31 is provided with a slot 33, through which passes a lever 34, one end of which is fulcrumed on a bracket 35 on the casing 22, the other end of said lever being hooked to provide for the attachment thereto of the flexible connection 21, above referred to. A temperature-regulating weight 36 is adjustable lengthwise of the lever 24, so that by setting said weight in or out on the lever greater or less resistance may be given to the movement of the diaphragm 30, and in this way the mechanism may be set to operate the automatic cut-off valve at any predetermined degree of temperature of the contents of the boiler, urn, or other receptacle, the heat causing the mercury or other expansive liquid in the bulb 29 to raise or deflect the diaphragm 30, and thereby set in motion the connections which influence and control the gas-supply valve.

The coupling or special fitting (shown in Fig. 9) is attached directly to the boiler 1 and has one arm or branch 37, through which the stem 28 passes, and another branch or arm 38, which leads to the heater 2.

In Fig. 2 the gas-supply pipe 3 is shown as arranged vertically, in which case the gas-valve 4 must be disposed horizontally. Under this arrangement instead of a straight lever, such as shown in Fig. 7, an elbow-lever 39 is employed, so that the outer portion of the lever may be disposed horizontally to be properly acted on by the flexible connection 21. In all other respects the arrangement is the same as shown in Fig. 1, with the exception, of course, that no side heater 2 is employed, an ordinary burner being located directly beneath the urn. A pilot-light is supplied by means of a pilot-tube 40, which leads from a nipple 41 on the gas-valve casing to the burner, so that when the gas is cut off from the main burner a small pilot jet or flame will remain burning and ignite the gas at the main burner when again turned on.

By means of the construction above described the burner takes care of itself, the supply of gas being governed by the temperature of the liquid being heated. Should any accident happen, such as the breakage of the mercury bulb or stem, the thermostat can be entirely cut off by turning the same through the medium of the handle 26.

Having described the invention, I claim as new—

1. The combination with a liquid-receptacle, of a gas-burner, a valve for controlling the flow of gas to said burner, a lever connected with said valve, a thermostat embodying a casing having a tubular extension which enters the liquid-receptacle, and a relatively movable member supported within said casing, said member being provided with a chamber adapted to be placed in communication with said tubular extension, a movable diaphragm contained in said chamber, a lever connected with and actuated by said diaphragm, connection between the two levers, and manually-operated means for moving said relatively movable member within said casing whereby the chamber of said member may be placed in communication with said tubular member or cut off therefrom.

2. The combination with a liquid-receptacle, of a gas-burner, a valve for controlling the flow of gas to said burner, a lever connected with said valve, a thermostat embodying a casing having a tubular extension which enters the liquid-receptacle, and a relatively movable member supported within said casing, said member being provided with a chamber adapted to be placed in communication with said tubular extension, a movable diaphragm contained in said chamber, a lever connected with and actuated by said diaphragm, connection between the two levers, manually-operated means for moving said relatively movable member within said casing whereby the chamber of said member may be placed in communication with said tubular member or cut off therefrom, and means for varying the degree of resistance to the movement of said diaphragm.

In testimony whereof I affix my signature in presence of two witnesses.

CLIFFORD BARGAMIN.

Witnesses:
GRACE BAYLISS,
J. R. CURRY.